A. F. MASURY.
ENGINE MOUNTING.
APPLICATION FILED SEPT. 3, 1915.
1,199,288.
Patented Sept. 26, 1916.
2 SHEETS—SHEET 2.
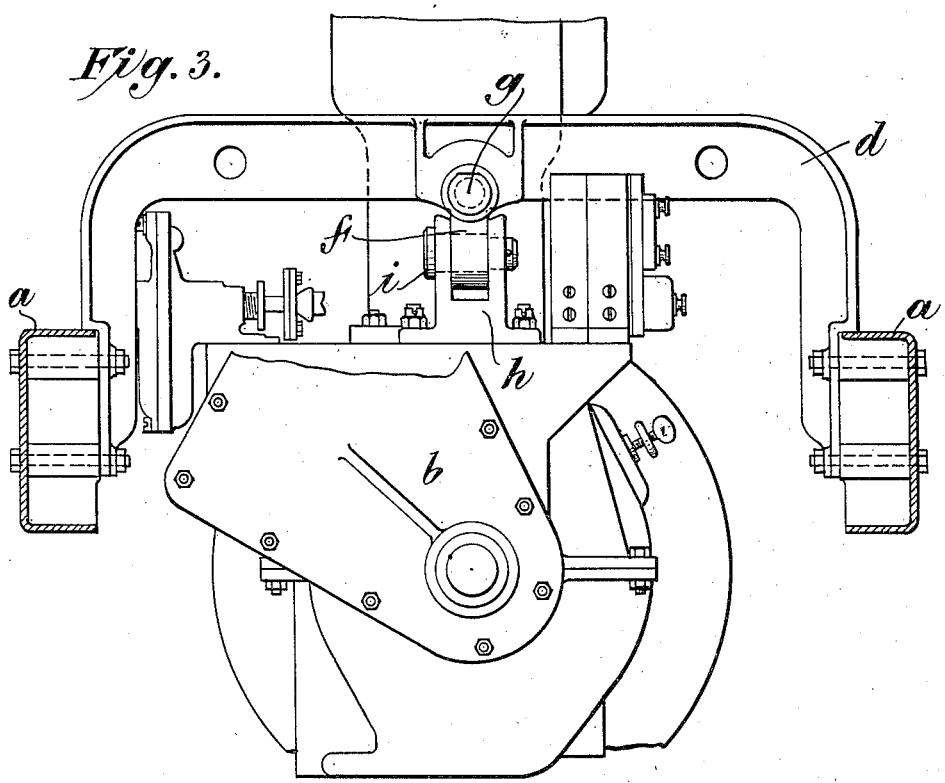
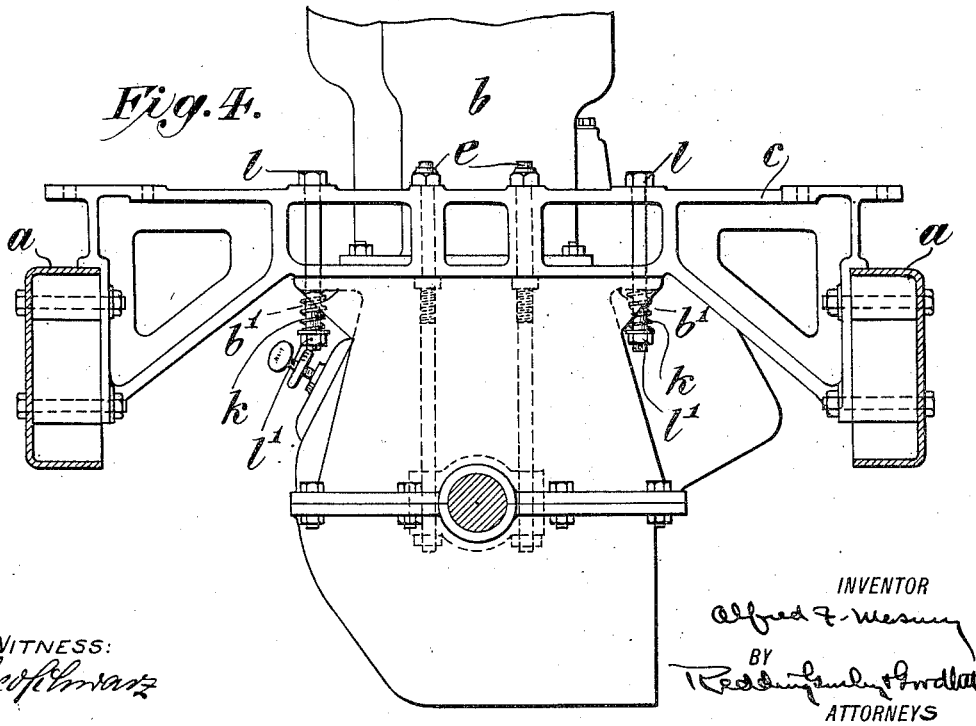

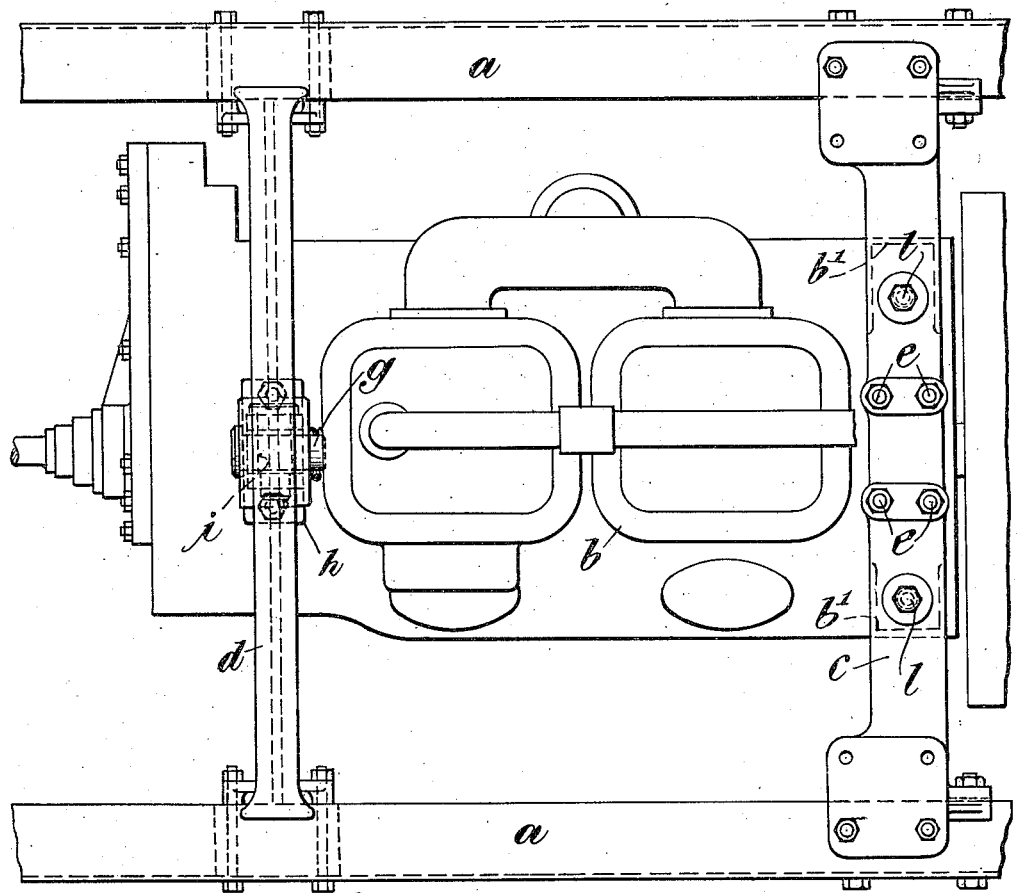
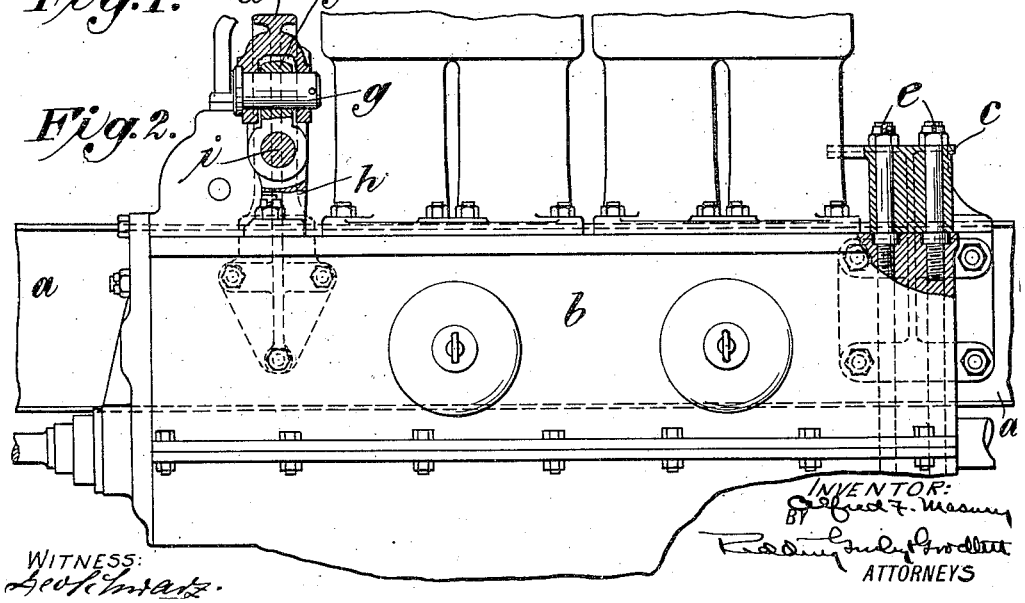

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

ENGINE-MOUNTING.

1,199,288. Specification of Letters Patent. Patented Sept. 26, 1916.

Application filed September 3, 1915. Serial No. 48,772.

*To all whom it may concern:*

Be it known that I, ALFRED F. MASURY, a citizen of the United States, residing in the borough of Manhattan, of the city of New York, in the county of New York, in the State of New York, have invented certain new and useful Improvements in Engine-Mountings, of which the following is a specification, reference being had to the accompanying drawings, which form a part hereof.

This invention relates to mountings for engines, and particularly for internal combustion engines of automobiles wherein it is necessary to make provision for lateral and longitudinal strains produced by movements of the main frame members of the chassis during operation of the car.

The invention has for its principal object to provide a support for an engine which shall permit the latter to yield slightly in both longitudinal and lateral directions with respect to the support and yet be maintained in proper position with sufficient rigidity to prevent the imposition of undue strains on the associated parts and on the metal of the engine itself. In accordance with the invention the engine casing is secured at its rear end to a suitable transverse support which, in the case of an automobile, is mounted on the main frame members of the chassis, and at its front end through a one point Hooke universal support to a second transverse member which is also mounted on the chassis. By this construction, movements of the engine in two planes with respect to the chassis are permitted to a desirable degree only, at the front end, while the rear end is maintained in comparative rigidity.

It is a further object of the invention, however, to provide suitable compensation for the slight movement at the rear end of the engine through stiff springs which oppose yieldingly all movement of the engine with respect to its transverse supports and tend, at all times, to restore the engine to its normal position.

Further advantages of the invention will appear in greater detail hereinafter in connection with the description of the preferred embodiment of the invention shown in the accompanying drawings in which—

Figure 1 is a fragmentary view in plan of a portion of the chassis of an automobile on which is mounted, in accordance with the invention, the propelling motor therefor. Fig. 2 is a fragmentary view in side elevation of the engine mounting shown in Fig. 1, parts being broken away to show the details of the mounting. Fig. 3 is a fragmentary view partly in transverse section and partly in front elevation of the motor shown in Fig. 1, illustrating particularly the one point universal support at its front end. Fig. 4 is a view similar to Fig. 3, but showing the mounting at the rear end of the motor.

For the purposes of this specification there has been illustrated in the drawings the usual channeled side frame members $a$ of an automobile chassis and, conventionally, an internal combustion engine $b$ for propelling the vehicle, although it will be evident as the description proceeds that the improved mounting may be applied to advantage equally well to vehicles and motors of any character.

In accordance with the invention, the motor is suspended from, or depends from, in contradistinction to resting on, the supporting members $c\ d$, proper, one of which, $c$, is disposed at the rear of the motor and extends between the main side frame channels $a$ and the other of which, $d$, is formed somewhat as a yoke and extends between the main channels at the front end of the motor. These transverse supports $c$, $d$ of course, serve the purpose of stiffening struts for the chassis and one of them, $c$, may afford support to the vehicle body, as will be understood. The rear transverse support $c$ has the casing of the motor $b$ secured thereto by bolts $e$ which pass down through the support and the wall of the engine casing so that the latter, while being suspended from the support is secured thereto with comparative rigidity. The degree of rigidity can be determined under different conditions of use for different engines, to some extent, by varying the distance between the bolts $e$ along the support $c$, it being understood that the farther apart the bolts are the greater resistance will be offered to turning moments on the engine.

The front end of the motor is suspended at one point only from the transverse yoke $d$ by means of a Hooke universal connection therewith formed, in the present instance, by a link $f$ which, as shown most clearly in Fig. 2, has two eyes therein, the axes of which are at right angles to one another. Through one of these eyes and registering openings adjacent the mid-section of the yoke, is passed a pin $g$, and through the other eye and registering openings in a supporting bracket $h$, is passed a second pin $i$. The support $h$ is secured fixedly to the front end of the engine casing and the entire construction just described, therefore, constitutes a one point Hooke universal suspension of the motor casing on the yoke $d$ allowing movement of the motor in two planes. It will be understood, of course, that the pin $g$ is so disposed in the yoke $d$ and the supporting bracket $h$ is so disposed with respect to the weight of the engine, that the engine will be in proper balance.

It will now be evident that relative movement between the side frame members $a$, in any direction, and under any condition of road use will not be transferred directly to the engine $b$ so as to impose undue strains on the engine and its associated parts, but that such relative movement will be permitted to a limited degree, and a resulting relative movement in two planes between the motor and the chassis will also be permitted to a limited degree, by reason of the improved mounting, and particularly by reason of the one point Hooke universal suspension of the motor on the yoke $d$. The motor may sway slightly to one side or the other or to front and rear or be tilted slightly, without danger of injuring the metal or any of the associated parts and without resisting to an undesirable degree that amount of flexibility which it is desirable to have in a motor chassis. This flexibility is not secured, in the present instance, at the sacrifice of rigidity for it is evident that the bolts $e$ at the rear end of the motor preserve comparative rigidity at all times. Further, the movement of the motor may be opposed yieldingly by stout springs $k$ which are interposed between the engine casing and the transverse support $c$ by passing bolts $l$ through the support and suitable flanges $b'$ on the motor casing so that the springs seat on the under side of these flanges and on nuts $l'$ at the ends of the bolts. In this way, tilting of the motor in either direction serves to place one of the springs $k$ under compression so that the tilting is opposed and this spring serves to assist in the return movement of the motor to its normal position.

It is to be understood that the foregoing description is based on the action of a motor mounted on the chassis by the improved supporting devices, as observed after thorough experimentation, but the movements referred to are relatively slight, especially at certain points in the mounting. It is also to be noted that while the illustrated embodiment has been described with great particularity both as regards the actual construction and the action of the parts in usage, other equivalent means for accomplishing the same results will suggest themselves to those skilled in the art but such modifications in structure and rearrangements as are adapted to realize the advantages pointed out are to be deemed within the spirit of this invention, provided they fall within the scope of the appended claims.

I claim as my invention:—

1. A mounting for automobile motors comprising, in combination with the main frame members of the chassis, a comparatively rigid transverse supporting member for the rear end of the motor and a one point Hooke universal support at the front end of the motor including a transverse yoke supported on the main frame members, a supporting bracket on the motor casing, and a universal coupling link pivotally connected to the yoke along an axis parallel to the longitudinal axis of the motor and to the bracket along a different axis transverse to the first-named axis whereby the motor is suspended flexibly and swinging movement thereof is permitted about the said two independent axes.

2. A mounting for automobile motors comprising, in combination with the main frame members of the chassis, a transverse supporting member for the rear end of the motor secured to the main frame members, spaced bolts passing downward through said transverse member and the motor casing to suspend the motor at the rear end in comparative rigidity, a one point universal support at the front end of the motor including a transverse yoke supported on the main frame members, a supporting bracket on the motor casing and a universal coupling link pivotally connected to the yoke at its mid-section and to the bracket whereby the motor is suspended flexibly at the front end, separate bolts passing downward through the transverse frame member at the rear end, nuts on the exposed ends of said bolts, and stout springs operatively interposed between the nuts and the motor casing to oppose yieldingly movements of the motor.

This specification signed this 1st day of September A. D., 1915.

A. F. MASURY.